US008680442B2

(12) United States Patent
Reusche et al.

(10) Patent No.: US 8,680,442 B2
(45) Date of Patent: Mar. 25, 2014

(54) SYSTEMS AND METHODS FOR A TEMPERATURE-CONTROLLED ELECTRICAL OUTLET

(75) Inventors: Thomas K. Reusche, Elburn, IL (US); Philip E. Chumbley, Aurora, IL (US); James R. McHugh, Downers Grove, IL (US)

(73) Assignee: Allied Precision Industries Inc., Elburn, IL (US)

( * ) Notice: Subject to any disclaimer, the term of this patent is extended or adjusted under 35 U.S.C. 154(b) by 2156 days.

(21) Appl. No.: 11/479,195

(22) Filed: Jun. 30, 2006

(65) Prior Publication Data
US 2007/0006603 A1 Jan. 11, 2007

Related U.S. Application Data

(60) Provisional application No. 60/698,029, filed on Jul. 11, 2005, provisional application No. 60/740,428, filed on Nov. 29, 2005.

(51) Int. Cl.
*H05B 1/02* (2006.01)

(52) U.S. Cl.
USPC ........... 219/507; 219/491; 219/494; 219/497; 219/501; 219/519

(58) Field of Classification Search
USPC ......... 219/491, 494, 497, 501, 504, 505, 507, 219/511, 519; 337/113, 300, 380, 112
See application file for complete search history.

(56) References Cited

U.S. PATENT DOCUMENTS

| | | | | |
|---|---|---|---|---|
| 3,659,781 A * | 5/1972 | Graham et al. | | 236/11 |
| 4,421,976 A * | 12/1983 | Jurek | | 219/506 |
| 4,538,134 A | 8/1985 | Carey | | |
| 4,741,476 A * | 5/1988 | Russo et al. | | 236/46 R |
| 4,776,514 A * | 10/1988 | Johnstone et al. | | 236/78 R |
| 4,864,269 A * | 9/1989 | Priebe | | 337/113 |
| 4,951,025 A * | 8/1990 | Finnegan et al. | | 337/113 |
| 5,456,407 A * | 10/1995 | Stalsberg et al. | | 236/46 R |
| 5,855,262 A * | 1/1999 | Jackson | | 191/12.4 |
| 6,243,626 B1 * | 6/2001 | Schanin | | 700/286 |
| 6,294,767 B1 * | 9/2001 | Sargeant et al. | | 219/519 |
| 6,907,680 B2 * | 6/2005 | Mariotti | | 34/486 |
| 7,385,473 B2 * | 6/2008 | Fabian et al. | | 337/36 |
| 2002/0063122 A1 * | 5/2002 | Katzman et al. | | 219/497 |

* cited by examiner

*Primary Examiner* — Mark Paschall
(74) *Attorney, Agent, or Firm* — Joseph M. Butscher; The Small Patent Law Group, LLC

(57) ABSTRACT

Certain embodiments of the present invention provide an electrical outlet including a power output adapted to provide electricity to an electrically coupled device, a switch adapted to activate and deactivate the power output, a temperature sensor adapted to detect a temperature, and a control unit in communication with the switch and the temperature sensor. The control unit is adapted to control the power output using the switch based at least in part on the temperature detected by the temperature sensor.

20 Claims, 5 Drawing Sheets

Front

Side

SYSTEMS AND METHODS FOR A TEMPERATURE-CONTROLLED ELECTRICAL OUTLET

RELATED APPLICATIONS

The present application relates to and claims the benefit of U.S. Provisional App. No. 60/698,029, entitled "Microprocessor-Controlled Electrical Outlet," filed Jul. 11, 2005 and U.S. Provisional App. No. 60/740,428, entitled "Temperature-Controlled Outlet for Outdoor Use," filed Nov. 29, 2005. The foregoing applications are herein incorporated by reference in their entirety.

BACKGROUND OF THE INVENTION

Embodiments of the present invention generally relate to electrical outlets. More particularly, embodiments of the present invention relate to systems and methods for a temperature-controlled electrical outlet.

There are a number of situations when it may be desirable to control the operation of a device based upon a temperature. For example, a thermostat in a house may be set to activate a furnace whenever the temperature inside the house falls to a point that is uncomfortable. Alternatively, the thermostat may activate an air conditioner when the temperature in the house gets too high. As another example, a space heater may be set up in a barn to turn on when the temperature falls below a certain level, or a water heater may be activated to keep a livestock water tank from freezing over.

Often, it is desirable to control a device that does not contain a thermostat. For example, a space heater in a barn may simply run when power is supplied to it. That is, the space heater runs when it is plugged in. Similarly, some deicers do not include temperature sensors to measure the water temperature, and instead heat the water when plugged in. Thus, it is desirable to be able to control a device based on temperature.

Some devices may contain thermostats to control their operation between pre-set temperatures. In the case of these thermostatically-controlled devices, it is often desirable to alter the operating range of the device. In these situations, the device may be controlled by an outlet that switches the electrical power to the device in accordance with the ambient temperature.

Typically, in a thermostatically-controlled device, a thermostat is placed in series with the electrical components of the device. The thermostat may include bimetal arms that serve as the electrical switch for the device, and no additional components are required. Thus, when a preset turn-on temperature is reached, the thermostat activates the flow of electricity to the electrical components. For example, a deicer with an integrated thermostat placed in a fluid is normally preset to turn on when the fluid temperature reaches a value approaching the freezing point and to turn off when the fluid temperature reaches a value tens of degrees above the freezing point.

Some existing devices include a remote electrical outlet that plugs into an existing outlet. The remote outlet contains its own thermostat and a relay to switch power based on the outside temperature. In those remote outlets, the thermostat functions similarly to those described above in thermostatically-controlled devices.

While these thermostatically-controlled outlets serve to alter the on/off points of the devices plugged into them, they suffer from the fact that their own internal thermostat is not adjustable. Thus, a different outlet with a different thermostat must be purchased if the user wishes to vary the temperature at which the device is energized.

Also, the on/off response of thermostats used in remote outlets will often vary over a temperature range of several degrees, thereby not correlating accurately or repeatably to the ambient temperature. Accurate and adjustable set points would greatly improve the versatility of a temperature-controlled outlet. Thus, it is highly desirable to be able to adjust the temperature set points and to more accurately track the temperature in a temperature-controlled electrical outlet.

For example, an outlet may contain a thermostat to activate a device, such as a livestock water tank, whenever the ambient air temperature falls to a point where freezing may occur. The following discussion assumes a freezing point of 32 degrees Fahrenheit (F.). In outlets with thermostats used to prevent freezing, the thermostat will normally turn on at around 40 degrees F. While the water will not freeze until it reaches 32 degrees F., the set point for turning on the thermostat is usually situated around 40 degrees F. to accommodate the uncertainty in accurately determining the set point during production. That is, the set points of a batch of thermostats designed to turn on at 40 degrees F. may actually have a spread of +/−7 degrees F. around that temperature.

The thermostats used are typically of the bimetal type. Typical turn-on/turn-off set points are around 40 degrees F. and 70 degrees F., respectively. However, the actual on/off temperatures of the thermostats are usually specified with a range of 5-8 degrees F. above and below these set points because, as mentioned above, the thermostat may have an actual spread of +/−7 degrees F. due to inaccuracy during production. While this range is necessary in order to keep the price of the thermostats down, it is not desirable from an operation standpoint since the device controlled by the outlet could be turned on when the water temperature is only 50 degrees F. with no danger of freezing. Operating a 1500 watt deicer, for example, can therefore be needlessly expensive.

As mentioned, because of the higher turn-on temperature, an outlet may energize a device such as a deicer to heat the water even on days when freezing conditions do not exist. For example, the temperature of the water in a livestock tank is directly affected by the surrounding air temperature. Thus, if the air temperature drops to 20 degrees F., the water will cool until it starts freezing at 32 degrees F. Since the air temperature has dropped below its 40 degree F. set point, the thermostatically-controlled outlet will turn on the deicer placed in the tank and heat the water to keep it from freezing. Suppose now, however, that the air temperature is 35 degrees F.—three degrees above freezing. The water will tend to cool down to that temperature but not freeze. However, once the air temperature drops below 40 degrees F., the outlet will energize the deicer to heat the water even though the water was never in danger of freezing. In that situation, energy will be wasted in heating the water.

Another problem is that the thermostat employed in the thermostatically-controlled outlet may exhibit hysteresis that negates its benefits. For example, consider a thermostat that turns on when the temperature drops to 35 degrees F. and turns off when the temperature rises to 45 degrees F., thus exhibiting a ten degree hysteresis. If the air temperature drops to 25 degrees F., the thermally-controlled outlet will be activated and a deicer plugged into it will be allowed to operate to keep the livestock tank from freezing. Suppose now, however, that the air temperature climbs to 39 degrees F. The tank is no longer in danger of freezing, but the deicer will still be allowed to turn on, thereby expending energy, because the deicer is set to turn on at 40 degrees F. and the thermally-controlled outlet is still activated since the air temperature has never climbed above 45 degrees F.

Thus, it is highly desirable to have an electrical outlet that is capable of making more accurate temperature determinations and of making intelligent decisions regarding temperature conditions.

Another problem with current thermostatically-controlled switches is that devices plugged into them, such as a deicer, may draw 10 Amps or more of current. As a connector is used, the contacts tend to get worn, thereby increasing the resistance at the contact point. With the thermostat located in close proximity to the contacts, the heat from the connections can influence the on/off operation of the thermostat with the result that the thermostatically-controlled outlet shuts off when it should actually be turned on. Thus, it is highly desirable to shield the temperature sensor in a thermostatically-controlled outlet from heat generated by the electrical contacts in the outlet.

A potentially hazardous problem is that existing thermally-controlled outlets are designed to be used indoors or in dry locations. The use of such outlets in livestock tanks, however, is almost always outdoors, where the device is exposed to the elements. The construction of the existing devices makes them susceptible to shorting out if exposed to water. Current systems, if protected at all, are typically placed within a water-resistant enclosure that must be opened when a device is plugged into it, negating much of the benefit of the enclosure. Thus, it is highly desirable to have a water-resistant outlet for outdoor use.

Thus, a need exists for a system and method of adjusting the temperature set points and to more accurately track the temperature in a temperature-controlled electrical outlet. In addition, a need exists for an electrical outlet that is capable of making more accurate temperature determinations and of making intelligent decisions regarding temperature conditions. Further, a need exists for a temperature-controlled outlet that shields the temperature sensor from heat generated by the electrical contacts in the outlet. Additionally, there is a need for a water-resistant outlet for outdoor use. Therefore, a need exists for systems and methods for a temperature-controlled electrical outlet.

BRIEF SUMMARY OF THE INVENTION

Certain embodiments of the present invention provide an electrical outlet including a power output adapted to provide electricity to an electrically coupled device, a switch adapted to activate and deactivate the power output, a temperature sensor adapted to detect a temperature, and a control unit in communication with the switch and the temperature sensor. The control unit is adapted to control the power output using the switch based at least in part on the temperature detected by the temperature sensor.

Certain embodiments of the present invention provide an electrical outlet including a power outlet adapted to provide electricity to an electrically coupled device, a temperature sensor, a switch adapted to control the power outlet based on the temperature sensor, and a main body supporting the power outlet, the temperature sensor, and the switch. The temperature sensor is thermally isolated from the power outlet.

Certain embodiments of the present invention provide a method for controlling power to a device based on temperature including programming a control unit with a user interface, detecting a temperature with a temperature sensor, and controlling a switch to with the control unit. The programming of the control unit includes adjusting a set point for the control unit. The switch is controlled with the control unit to control a flow of electricity to an electrically coupled device based on the temperature and the set point.

Figure 1:
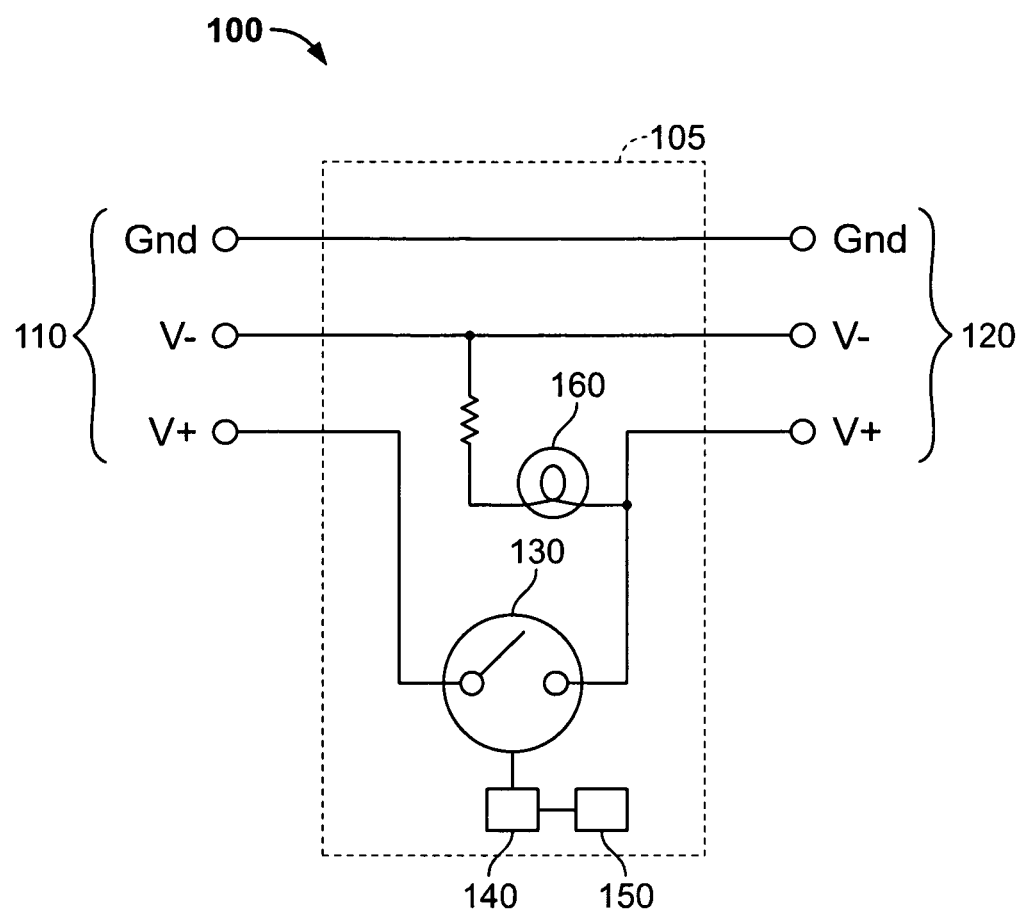
FIG. 1 illustrates a schematic diagram of an electrical outlet according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a schematic diagram of an electrical outlet 100 according to an embodiment of the present invention. The outlet 100 includes a main body 105. The main body 105 is adapted to support an electrical input 110, an electrical output 120, a switch 130, a control unit 140, and a temperature sensor 150. In addition, as illustrated in FIG. 1, the electrical outlet 100 may include an operation indicator 160. In certain embodiments, one or more of the elements illustrated in FIG. 1 may not be included.

The electrical output 120 is in electrical communication with the electrical input 110 and the switch 130. The control unit 140 is in electrical communication with the switch 130 and the temperature sensor 150.

In operation, the electrical output 120 provides electricity to a device electrically coupled to the electrical output 120. The electricity provided by the electrical output 120 is provided to the electrical outlet 100 via the electrical input 110. The outlet 100 is adapted to provide power to an electrically coupled device based at least in part on a temperature.

The electrical input 110 is adapted to provide power to the electrical output 120. The electrical input 110 may be electrically coupled and/or connected to the control unit 140. The electrical input 110 may be include and/or be electrically coupled to the outlet 100 by a power cord, for example. In certain embodiments, the electrical input 110 includes a plug, outlet, and/or receptacle for power from a standard alternating current (AC) power source. Alternatively, the electrical input 110 may draw power from a solar cell, a battery, and/or a standard electrical outlet.

The electrical output 120 is adapted to provide power to an electrically coupled device. The electrical output 120 may include a plug, outlet, and/or receptacle for a standard alternating current (AC) power source, for example.

As an example, the electrical input 110 may be a three-prong male electrical plug. The electrical output 120 may be a three-prong female receptacle in the same enclosure. In the exemplary embodiment illustrated in FIG. 1, the neutral (V−)

male lead of the electrical input 110 is connected to the neutral (V−) female lead of the electrical output 120. The male ground (Gnd) lead of the electrical input 110 is connected to the female ground (Gnd) lead of the electrical output 120. The male hot (V+) lead of the electrical input 110 is connected to one side of the switch 130, with the other side of the switch 130 connected to the female hot (V+) lead of the electrical output 120.

The flow of electricity from the electrical input 110 to the electrical output 120 is regulated and/or controlled by the switch 130. The control unit 140 activates and/or deactivates the switch 130 based at least in part on a temperature sensed by the temperature sensor 150. That is, the control unit 140 uses the switch 130 to control the flow of power from the electrical input 110 to the electrical output 120, and thus to a device electrically coupled to the electrical output 120.

For example, the outlet 100 plugs into a standard electrical outlet with the electrical input 110. The electrical apparatus to be switched in accordance with the air temperature can then be plugged into the electrical output 120 on the outlet 100. When the air temperature falls below a set-point, the switch 130 is closed and electrical connection is made between the electrical input 110 and the electrical output 120, thus providing electrical power to the external apparatus.

The switch 130 is adapted to control the flow of power to the electrical output 120. The switch 130 may be used to activate and/or deactivate the electrical output 120 by controlling the flow of power to the electrical output 120 from the electrical input 110, for example. The switch 130 may be controlled by the control unit 140. Alternatively, the switch may be controlled by the temperature sensor 150.

The switch 130 may be a relay or a latching relay, for example. As discussed above, the switch 130 may be controlled by the control unit 140 to activate and/or deactivate the electrical output 120. Optionally, the switch 130 may be a semiconductor switch, such as a triac. In certain embodiments, the switch 130 includes both a relay and a triac, where one controls the other. For example, the switch 130 may be a relay controlled by a triac.

The control unit 140 is adapted to control the electrical output 120. In certain embodiments, the control unit 140 controls the electrical output 120 using the switch 130. As discussed above, the control unit 140 may use the switch 130 to activate and/or deactivate the electrical output 120. In certain embodiments, the control unit 140 is adapted to control the electrical output 120 based at least in part on a predetermined temperature, such as a stored temperature value within the control unit 140. Alternatively, the control unit 140 may be adapted to control the electrical output 120 based on one or more adjustable temperatures and/or set points. The adjustable temperatures and/or set point may be adjusted by a user, for example. In certain embodiments, the control unit 140 is adapted to control the electrical output 120 based at least in part on a time interval. For example, the control unit 140 may activate the electrical output 120 for a calculated period of time.

In certain embodiments, the control unit 140 includes a processor or microprocessor. The control unit 140 may include an integrated circuit and/or be implemented using one or more discrete logic components. For example, the control unit 140 may be implemented using one or more chips including gates such as AND, OR, NAND, and NOR gates. The control unit 140 may include more than one processor, microprocessor, and/or integrated circuit. For example, different functions and/or capabilities of the control unit 140 may be handled by different processors, microprocessors, and/or integrated circuits.

In certain embodiments, the control unit 140 is adapted to read and/or determine a temperature through the temperature sensor 150. The temperature may be an ambient air temperature, for example. Further, the control unit 140 may be capable of tracking elapsed time. For example, the control unit 140 may be capable of determining how long the electrical output 120 has been activated. As another example, control unit 140 may be capable of determining and/or measuring the number of milliseconds and/or microseconds between temperature readings/determinations. In certain embodiments, the control unit 140 may read and/or determine the temperature using more than one temperature sensor. For example, the control unit 140 may average temperature readings from multiple temperature sensors.

In certain embodiments, the control unit 140 may be programmable. That is, the control unit 140 may perform specific functions based at least in part on programming and/or indicators directing the control unit 140 to operate in a particular manner or perform a sequence of operations. For example, programming for the control unit 140 may be software and/or firmware. As another example, based on a switch, the control unit 140 may activate and/or deactivate the power output 120 for a predetermined period of time. The programming of the control unit may include specifying and/or adjusting one or more temperature set points. For example, a turn-on temperature may be adjusted.

In certain embodiments, the control unit 140 is adapted to be programmed by a user. For example, a user may push a button to select a mode so the control unit 140 operates the outlet 100 in that mode. In certain embodiments, the control unit 140 is adapted to be programmed by an input device. The input device may include, for example, a button, switch, tilt sensor, tip sensor, communications port, network interface, wireless interface, and/or power line communication. For example, a user may push a button to indicate to the control unit 140 that the turn-on temperature for the outlet 100 should be raised by 1 degree F. As another example, programming information may be communicated to the control unit 140 over wireless radio or over a signal superimposed on a power signal.

The temperature sensor 150 is adapted to determine and/or detect a temperature. The temperature sensor 150 may be adapted to determine an air temperature, for example. In certain embodiments, one or more temperature sensors may be included in the outlet 100. Moreover, the temperature sensor 150 may be adapted to communicate the detected and/or determined temperature to the control unit 140. The resolution or sensitivity of the temperature sensor 150 may be selected to be on the order of 1 degree F., for example. Alternatively, the resolution or sensitivity of the temperature sensor 150 may be selected to be on the order of 0.2 degrees F. In certain embodiment, the temperature sensor 150 exhibits little, or no, hysteresis.

Although the above discussion refers to the determination of a temperature, it is to be understood that the temperature sensor may actually determine and/or measure only a current or voltage, for example, that is correlated and/or calibrated to represent a particular temperature. The temperature sensor 150 may include one or more of a thermistor, thermometer, thermocouple, resistance temperature detector, silicon bandgap temperature sensor, and/or other component adapted to create a signal that may be measured electronically and/or electrically as a function of temperature.

In certain embodiments, an operation indicator 160 is present. The operation indicator 160 is adapted to indicate when the outlet 100 is operating. For example, the operation indicator 160 may be a light or lamp that is illuminated when the power output 120 is activated. As another example, the operation indicator 160 may be a neon lamp in series with a current-limiting resistor. The lamp may be connected between the output side of the switch 130 and the neutral leads of the electrical input 110 and the electrical output 120. When the switch 130 is closed, the neon lamp illuminates to indicate that power is passing through the device.

In certain embodiments, one or more of the components of the outlet 100 are molded and/or potted to electrically insulate them and eliminate any areas where water could collect within the device. For example, the switch 130, the control unit 140, and/or the temperature sensor 150 may be enclosed in an electronics cavity in the main body 105. For example, the electronics cavity may be water-resistant and/or waterproof. In certain embodiments, the electronics cavity is at least partially filled and/or sealed with a water-resistant material such as epoxy. In addition, the main body 105 of the outlet 100 may be molded to prevent the entry and/or collection of water in and around the electrical input 110 and/or the electrical output 120.

The main body 105 of the outlet 100 may be adapted to be mounted in an in-wall electrical box. Alternatively, the main body 105 of the outlet 100 may be adapted to be plugged directly into an existing power outlet. In certain embodiments, the main body 105 may include an extension cord.

In certain embodiments, the switch 130, the control unit 140, and/or the temperature sensor 150 may be remote from the electrical input 110 and/or the electrical output 120. For example, the electrical input 110 and the electric output 120 may be at opposite ends of an extension cord. The switch 130, the control unit 140, and/or the temperature sensor 150 may be mounted in an enclosure at the midpoint of the extension cord, or, alternatively, near the end with the electrical input 110 or the electrical output 120. As another example, the outlet 100 may be integrated in another device. For example the outlet may actually be part of the power cord of another device, such as a deicer.

In certain embodiments, the outlet 100 includes a remote temperature sensor. The remote temperature sensor may be similar to the temperature sensor 150, described above, for example. The remote temperature sensor may include one or more of a thermistor, thermometer, thermocouple, resistance temperature detector, silicon bandgap temperature sensor, and/or other component adapted to create a signal that may be measured electronically and/or electrically as a function of temperature.

The remote temperature sensor is adapted to determine a remote temperature. The remote temperature may be an ambient air temperature, water temperature, surface temperature, or internal temperature, for example. For example, the remote temperature sensor may be located inside a cooling unit.

The remote temperature sensor is in communication with the control unit 140. The remote temperature sensor may communicate with the control unit 140 over a wire and/or wirelessly, for example. The remote temperature sensor may be detachably connected to the outlet 100. That is, the remote temperature sensor may be connected and/or disconnected from the rest of the outlet 100. For example, the remote temperature sensor may include a cord and plug that may be plugged and unplugged into a jack on the main body 105.

In certain embodiments, the control unit 140 is adapted to read and/or determine a remote temperature through the remote temperature sensor. The control unit 140 may control the electrical output 120 based at least in part on the remote temperature detected by the remote temperature sensor. In certain embodiments, when the remote temperature sensor is present, the control unit 140 controls the electrical output 120 based on the remote temperature and not the temperature detected by the temperature sensor 150. In certain embodiments, the control unit 140 is adapted to be programmed to select which temperature, the temperature detected by temperature sensor 150 or the remote temperature detected by the remote temperature sensor, is to be used to control the electrical output 120. For example, the temperature detected by the temperature sensor 150 may be used to determine whether the electrical output 120 should be activated, and the remote temperature detected by the remote temperature sensor may be used to determine whether the electrical output 120 should be deactivated.

Figure 2A:
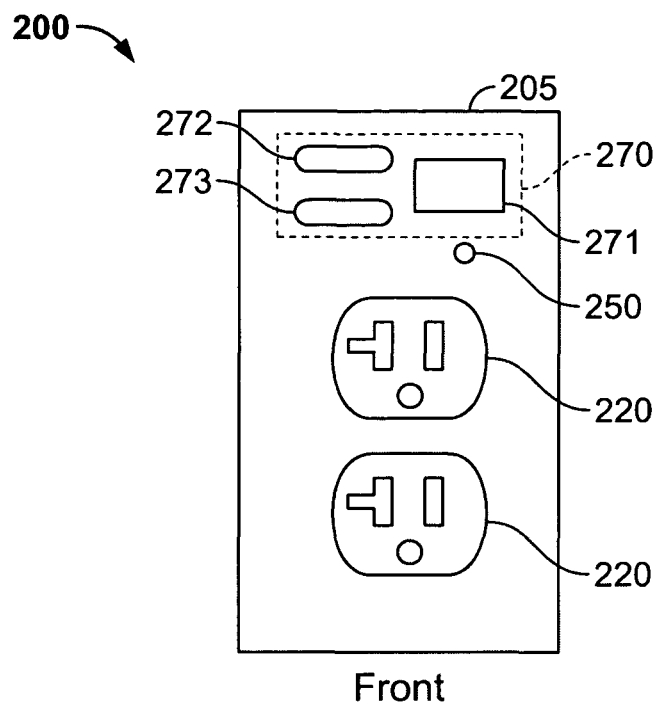
FIG. 2A illustrates a front view of an electrical outlet according to an embodiment of the present invention.
Figure 2B:
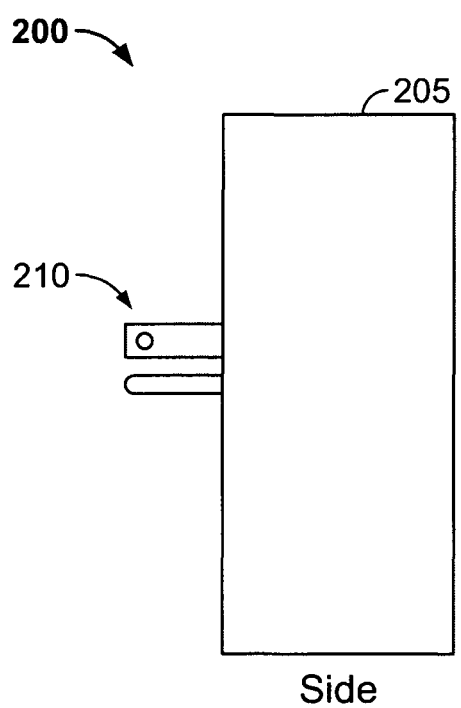
FIG. 2B illustrates a side view of an electrical outlet according to an embodiment of the present invention.

FIG. 2A illustrates a front view of an electrical outlet 200 according to an embodiment of the present invention. FIG. 2B illustrates a side view of the electrical outlet 200 according to an embodiment of the present invention. Referring to FIGS. 2A and 2B, the electrical outlet 200 includes a main body 205. The main body 205 is adapted to support a power input 210, one or more power outputs 220, a temperature sensor 250, an a user interface 270.

The one or more power outputs 220 are in electrical communication with the power input 210. The one or more power outputs 320 may be controlled by a switch and/or a control unit, similar to the switch 130 and the control unit 140, respectively, described above.

The electrical outlet 200 may be similar to the electrical outlet 100, described above. The main body 205 may be similar to the main body 105, described above. The power input 210 may be similar to the electrical input 110, described above. One or more of the power output 220 may be similar to the electrical output 120, described above. The temperature sensor 250 may be similar to the temperature sensor 150, described above.

The user interface 270 may be and/or include an one or more input devices such as buttons, switches, communications ports, network interfaces, wireless interfaces, and/or power line communication. The user interface 270 may include one or more feedback or status devices such as displays or lights. For example, as illustrated in FIG. 2A, the user interface 270 may include an LCD screen 271, an increment/decrement rocker button 272, and a select button 273.

In operation, similar to the outlet 100, described above, the outlet 200 is adapted to control the supply of power to a device electrically coupled to the power output 220 based on the temperature sensor 250. The power output 220 may be activated and/or deactivated when the temperature detected by the temperature sensor 250 equals, exceeds, or falls below a set-point. The power output 220 may be activated and/or deactivated by a control unit, for example, similar to the control unit 140, described above.

The user interface 270 is adapted to allow a user to program and/or configure the outlet 200. The user interface 270 may be used to program a control unit, similar to the control unit 140, described above. For example, the user interface 270 may allow a user to specify temperature set points for the outlet 200. The temperature set points may be turn-on and turn-off temperatures. The set points may be used by a control unit to control the power output 220. The user interface 270 may be used to display current set points. For example, a user may use the select button 273 to cycle through the currently configured set points, which are displayed on the LCD screen 271. The rocker switch 272 may be used to adjust the currently displayed set point. As another example, the user interface 270 may be used to set a timer for how long the power output 220 should be activated. As another example, the user interface 270 may be used to manually turn on or turn off the outlet 200.

Figure 3:
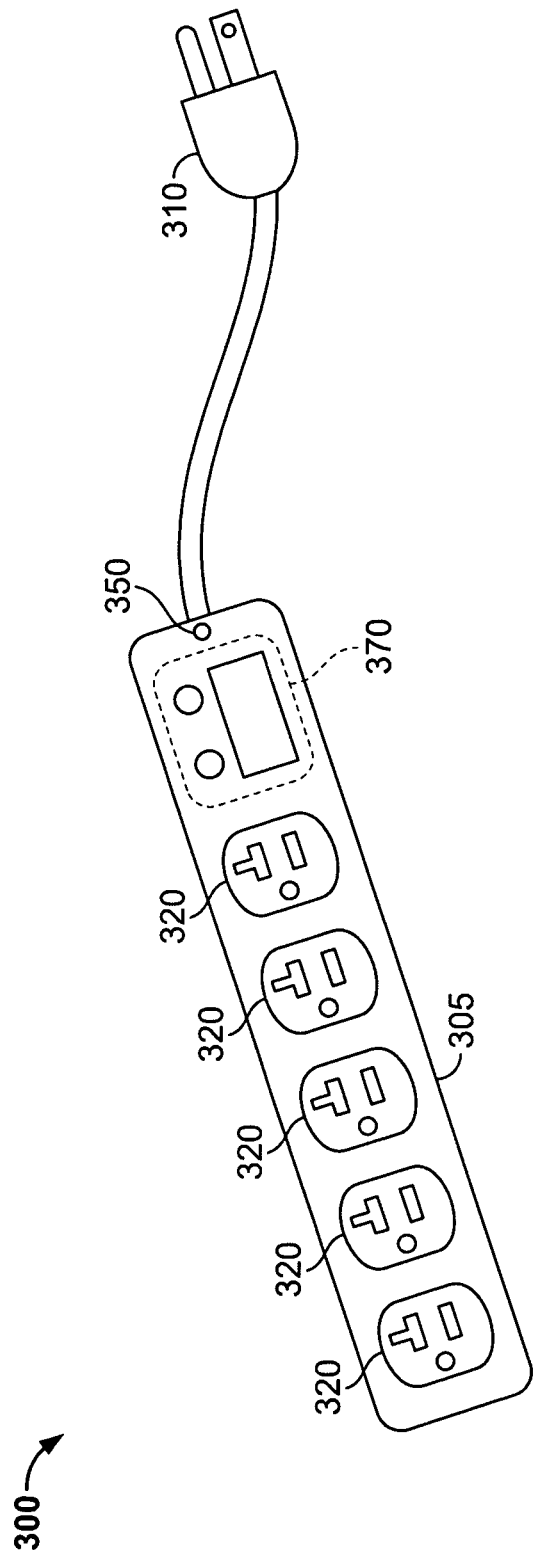
FIG. 3 illustrates a top view of an electrical outlet strip according to an embodiment of the present invention.

FIG. 3 illustrates a top view of an electrical outlet strip 300 according to an embodiment of the present invention. The outlet strip 300 includes a main body 305. The main body 305 is adapted to support a power input 310, a plurality of power outputs 320, and a user interface 370.

The plurality of power outputs 320 are in electrical communication with the power input 310. The plurality of power outputs 320 may be controlled by a switch and/or a control unit, similar to the switch 130 and the control unit 140, respectively, described above.

The outlet strip 300 may be similar to the electrical outlet 100 and/or the electrical outlet 200, described above. The main body 305 may be similar to the main body 105, described above. The power input 310 may be similar to the electrical input 110, described above. One or more of the power output 320 may be similar to the electrical output 120, described above. The temperature sensor 350 may be similar to the temperature sensor 150, described above. The user interface 370 may be similar to the user interface 270, described above.

In operation, similar to the outlet 100 and outlet 200, described above, the outlet strip 300 is adapted to control the supply of power to a device electrically coupled to a power output 320 based on the temperature sensor 350. One or more of the power outputs 320 may be activated and/or deactivated when the temperature detected by the temperature sensor 350 equals, exceeds, or falls below a set-point. One or more of the power outputs 320 may be activated and/or deactivated by a control unit, for example, similar to the control unit 140, described above. That is, in certain embodiments, the control unit 140 is adapted to individually control each of the plurality of power outputs 320.

The user interface 370 may be and/or include an one or more input devices such as buttons, switches, communications ports, network interfaces, wireless interfaces, and/or power line communication. The user interface 370 may include one or more feedback or status devices such as displays or lights.

The user interface 370 is adapted to allow a user to program and/or configure the outlet strip 300. The user interface 370 may be used to program a control unit, similar to the control unit 140, described above. In certain embodiments, the user interface 370 may be used to configure and/or specify different temperature set points for each of the plurality of power outputs 320. Alternatively, groups of power outputs in the plurality of power outputs 320 may have set points specified. Or, as another option, all power outputs 320 may share one or more set points. For example, each power output 320 may have the same turn-on temperature, but a different turn-off temperature, depending on the type of device coupled to each individual power output 320.

Figure 4:
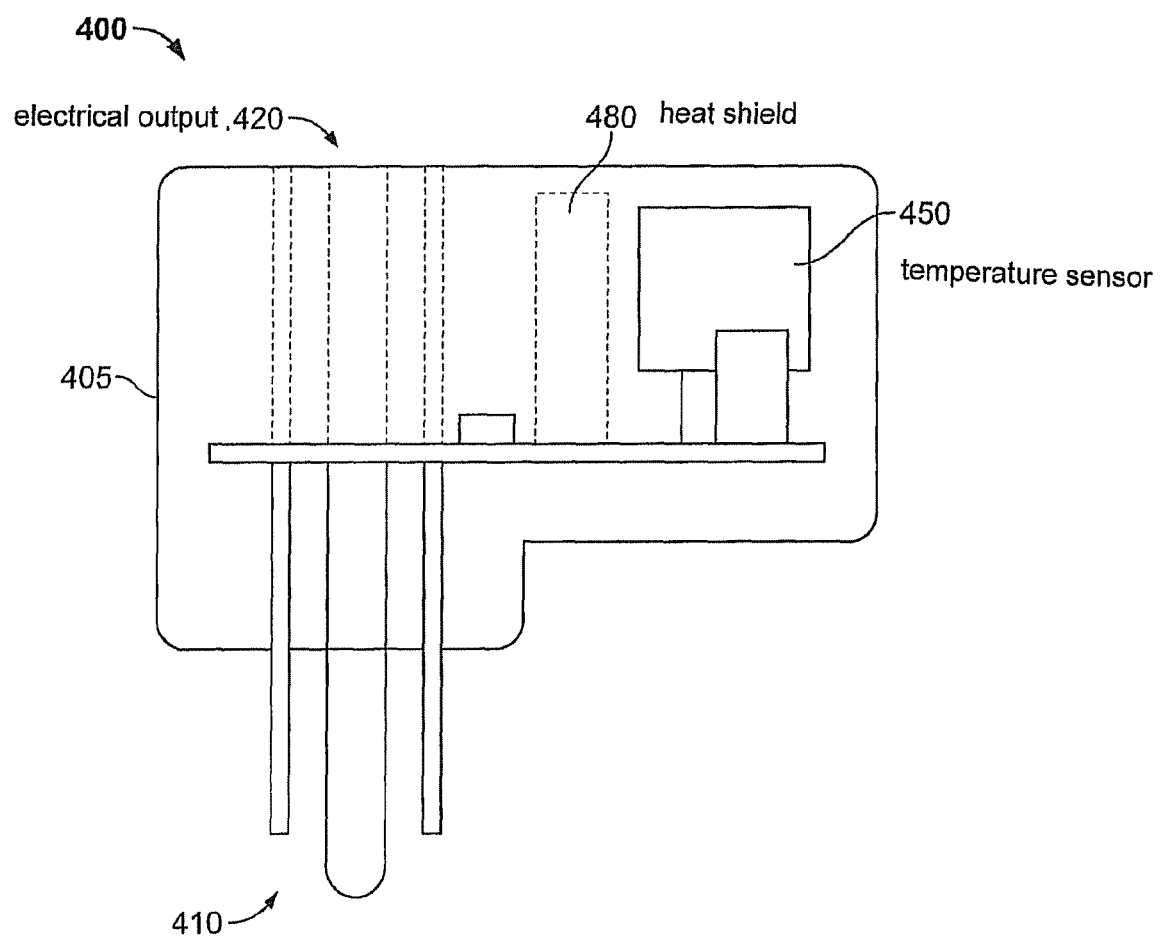
FIG. 4 illustrates a side cross sectional view of an electrical outlet according to an embodiment of the present invention.

FIG. 4 illustrates a side cross sectional view of an electrical outlet 400 according to an embodiment of the present invention. The outlet 400 includes a main body 405. The main body 405 is adapted to support an electrical input 410, an electrical output 420, a temperature sensor 450, and a heat shield 480. In addition, the electrical outlet 400 may include a switch and a control unit. In certain embodiments, one or more of the elements illustrated in FIG. 4 may not be included.

The electrical output 420 is in electrical communication with the electrical input 410. The electrical output 420 may be controlled by a switch and/or a control unit, similar to the switch 130 and the control unit 140, respectively, described above. The heat shield 480 is positioned at least in part between electrical connection between the electrical input 410 and the electrical input 420 and the temperature sensor 450.

The outlet 400 may be similar to the outlet 100, described above. The main body 405 may be similar to the main body 105, described above. The electrical input 410 may be similar to the electrical input 110, described above. The electrical output 420 may be similar to the electrical output 420, described above. The temperature sensor 450 may be similar to the temperature sensor 150, described above.

In operation, similar to the outlet 100, outlet 200, and outlet strip 300, described above, the outlet 400 is adapted to control the supply of power to a device electrically coupled to an electrical output 420 based on the temperature sensor 450. The electrical output 420 may be activated and/or deactivated when the temperature detected by the temperature sensor 450 equals, exceeds, or falls below a set-point. The electrical output 420 may be activated and/or deactivated by a control unit, for example, similar to the control unit 140, described above.

As discussed above, resistance at the point of contact between electrical leads may cause localized heating, particularly when currents are high (e.g., 10 Amps). The electrical leads may include the electrical input 410, the electrical output 420, and connecting circuitry, for example. The heat generated by the combination of increased resistance and high current may migrate along wires and through supporting structure of the outlet 400 to interfere with the operation of the temperature sensor 450. For example, the temperature sensor 450 may read a higher temperature due to this transmitted heat than the actual ambient temperature that is desired to be read. Thus, the electrical output 420 may be deactivated because of the higher detected temperature even though the electrical output 420 should not be deactivated because of the actual air temperature.

The heat shield 480 is positioned to improve the thermal insulation between the temperature sensor 450 and the electrical connections including the electrical input 410 and the electrical output 420. That is, the heat shield 480 acts as a thermal barrier between the electrical components generating heat and the temperature sensor 450. The heat shield 480 may include an air gap. For example, the heat shield 480 may include an air gap formed in the main body 405 with a width of one-sixteenth of an inch. The main body 405 of the outlet 400 may be made of rubber, with a thermal conductivity of rubber of approximately 0.28 W/m-K (watts/meter-kelvin). The air gap used as the heat shield 480, on the other hand, may have a thermal conductivity of approximately 0.024 W/m-K. Therefore, the effect of the air gap is to decrease the amount of heat that flows to the temperature sensor 450, thus improving its thermal isolation. Alternatively, a layer of a material with a low thermal conductivity may be used in the heat shield 480.

In certain embodiments, the temperature sensor 450 is thermally isolated from one or more elements of the outlet 400. The temperature sensor 450 may be thermally isolated by the heat shield 480, for example. A thermally isolating material may be used to thermally isolate the temperature sensor 450. The thermally isolating material 132 may include epoxy or other material with effective thermal insulation properties, for example.

Figure 5:
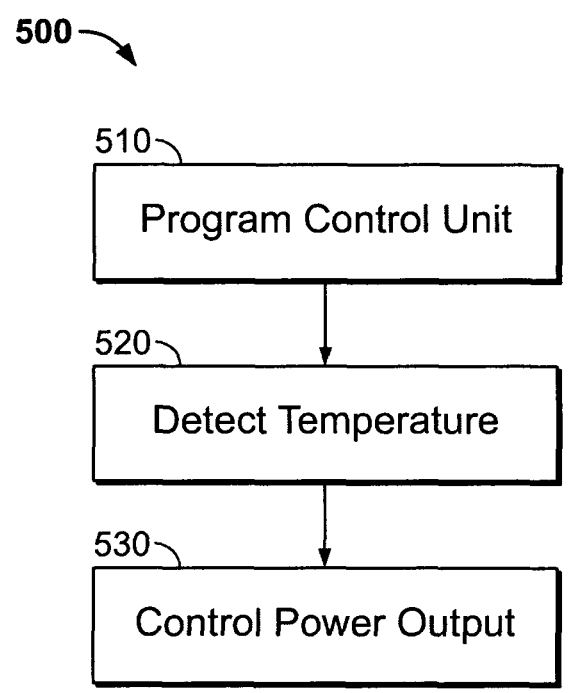
FIG. 5 illustrates a flow diagram for a method for controlling power to a device based on temperature according to an embodiment of the present invention.

FIG. 5 illustrates a flow diagram for a method 500 for controlling power to a device based on temperature according to an embodiment of the present invention. The method 500 includes the following steps, which will be described below in more detail. At step 510, a control unit is programmed. At step 520, a temperature is detected. At step 530, a power output is controlled with a control unit. The method 500 is described with reference to elements of systems described above, but it should be understood that other implementations are possible.

At step 510, a control unit is programmed. The control unit may be similar to control unit 140, described above, for example. The control unit may perform specific functions based at least in part on programming and/or indicators directing the control unit to operate in a particular manner or perform a sequence of operations. For example, programming for the control unit 140 may be software and/or firmware. As another example, based on a switch, the control unit 140 may activate and/or deactivate the power output 120 for a predetermined period of time. The programming of the control unit may include specifying and/or adjusting one or more temperature set points. For example, a turn-on temperature may be adjusted.

The control unit may be programmed by a user. For example, a user may push a button to select a mode so the control unit 140 operates the outlet 100 in that mode. In certain embodiments, the control unit is programmed by an input device. The input device may include, for example, a button, switch, tilt sensor, tip sensor, communications port, network interface, wireless interface, and/or power line communication. For example, a user may push a button to indicate to the control unit 140 that the turn-on temperature for the outlet 100 should be raised by 1 degree F. As another example, programming information may be communicated to the control unit 140 over wireless radio or over a signal superimposed on a power signal.

At step 520, a temperature is detected. The temperature may be detected by a temperature sensor, for example. The temperature sensor may be similar to temperature sensor 150, described above, for example. The temperature may be an air temperature, for example. The resolution or sensitivity of the detected temperature may be on the order of 1 degree F. Alternatively, the resolution or sensitivity of the detected temperature may be on the order of 0.2 degrees F. In certain embodiment, the temperature sensor 150 exhibits little, or no, hysteresis.

The temperature may be detected by a thermistor, thermometer, thermocouple, resistance temperature detector, silicon bandgap temperature sensor, and/or other component adapted to create a signal that may be measured electronically and/or electrically as a function of temperature.

The temperature may be read from the temperature sensor 150 by a control unit such as control unit 140. The control unit may be the control unit programmed at step 510, for example. In certain embodiments, a control unit may detect, read, and/or determine the temperature using one or more temperature sensors.

At step 530, a power output is controlled. The power output may be similar to the electrical output 120, described above, for example. The power output may be controlled by a control unit such as control unit 140, described above. The control unit may be the control unit programmed at step 510, discussed above.

In certain embodiments, the control unit controls the power output by activating and/or deactivating the flow of power to the power output. The flow of power may be controlled by a switch, for example. The switch may be similar to switch 130, described above, for example. A device that is electrically coupled to the power output may be controlled by the activation and/or deactivation of the power output.

The control unit may activate and/or deactivate the power output based at least in part on a temperature sensed by a temperature sensor. The temperature sensor may be similar to temperature sensor 150, described above, for example. The temperature may be the temperature detected at step 520, described above, for example. The temperature detected by the temperature sensor 150 may be communicated to the control unit 140, for example. In certain embodiments, the control unit may control the power output based at least in part on elapsed time. For example, the control unit 140 may control the power output 120 based on how long the power output has been activated. As another example, control unit 140 may control the power output 120 based on a measurement of the number of milliseconds and/or microseconds between temperature readings/determinations.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments of the present invention provide systems and methods for a temperature-controlled electrical outlet. Certain embodiments provide a technical effect of providing a temperature-controlled electrical outlet.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An electrical outlet comprising:
a power output adapted to provide electricity to an electrically coupled device;
a switch adapted to activate and deactivate said power output, said switch comprising a triac and a relay, wherein said triac controls said relay in order to activate and deactivate said power output;
a temperature sensor adapted to detect a temperature; and
a control unit in communication with said switch and said temperature sensor, wherein said control unit is adapted to control said power output using said switch based at least in part on the temperature detected by said temperature sensor, wherein said control unit is adapted to be programmed at least in part by a user interface, and wherein said user interface includes a power line receiver, said power line receiver adapted to receive a programming signal superimposed on an alternating current.

2. The outlet of claim 1, wherein the temperature is an ambient air temperature.

3. The outlet of claim 1, wherein said temperature sensor includes at least one of a thermistor, thermocouple, resistance temperature detector, thermometer, and silicon bandgap temperature sensor.

4. The outlet of claim 1, wherein said temperature sensor is thermally isolated from said power output.

5. The outlet of claim 1, wherein said control unit comprises at least one of a processor, a microprocessor, an integrated circuit, and a plurality of discrete logic components.

6. The outlet of claim 1, wherein said user interface is adapted to allow a user to adjust at least one of a turn-on set point and a turn-off set point.

7. The outlet of claim 1, wherein said control unit is adapted to utilize at least one of an adjustable turn-on set point and an adjustable turn-off set point.

8. The outlet of claim 1, further comprising a power input component electrically connected to said power output.

9. The outlet of claim 1, wherein said power output is one of a plurality of power outputs adapted to provide electricity to a plurality of electrically coupled devices.

10. The outlet of claim 9, wherein each of said plurality of power outputs is individually controlled by said control unit using an associated switch.

11. The outlet of claim 1, further including a remote temperature sensor adapted to detect a remote temperature, wherein said remote temperature sensor is in communication with said control unit.

12. The outlet of claim 11, wherein said control unit is adapted to control said power output using said switch based at least in part on the remote temperature detected by said remote temperature sensor.

13. An electrical outlet comprising:
  a power outlet adapted to provide electricity to an electrically coupled device;
  a temperature sensor, wherein said temperature sensor is thermally isolated from said power outlet by an air gap;
  a switch adapted to control said power outlet based on said temperature sensor, said switch comprising a triac and a relay, wherein said triac controls said relay in order to control said power outlet; and
  a main body supporting said power outlet, said temperature sensor, and said switch.

14. The electrical outlet of claim 13, wherein said main body is adapted to be placed in a wall mount.

15. The electrical outlet of claim 13, wherein said main body is included in an extension cord.

16. The electrical outlet of claim 13, wherein said main body is potted to electrically insulate said electrical outlet to prevent at least one of entry and collection of water within said electrical outlet.

17. An electrical outlet comprising:
  a power output adapted to provide electricity to an electrically coupled device;
  a switch adapted to activate and deactivate said power output;
  a temperature sensor adapted to detect a temperature;
  a control unit in communication with said switch and said temperature sensor, wherein said control unit is adapted to control said power output using said switch based at least in part on the temperature detected by said temperature sensor; and
  a user interface including an LCD screen, an increment/decrement rocker button and a select button, said control unit being programmed at least in part through said user interface, wherein temperature options are changed through said increment/decrement rocker button and selected through said select button.

18. An electrical outlet comprising:
  a power outlet adapted to provide electricity to an electrically coupled device;
  a temperature sensor, wherein said temperature sensor is thermally isolated from said power outlet;
  a switch adapted to control said power outlet based on said temperature sensor;
  a main body supporting said power outlet, said temperature sensor, and said switch; and
  a user interface including an LCD screen, an increment/decrement rocker button and a select button, wherein temperature options are changed through said increment/decrement rocker button and selected through said select button.

19. A method for controlling power to a device based on temperature, said method comprising:
  programming a control unit with a user interface including an LCD screen, an increment/decrement rocker button and a select button, wherein said programming said control unit includes adjusting a set point for said control unit by changing possible set points through the increment/decrement rocker button and selecting a desired set point through said select button;
  detecting a temperature with a temperature sensor; and
  operating a switch with said control unit to control a flow of electricity to an electrically coupled device based on the temperature and the set point.

20. An electrical outlet comprising:
  a power outlet adapted to provide electricity to an electrically coupled device;
  a temperature sensor, wherein said temperature sensor is thermally isolated from said power outlet;
  a switch adapted to control said power outlet based on said temperature sensor, said switch comprising a triac and a relay, wherein said triac controls said relay in order to control said power outlet; and
  a main body supporting said power outlet, said temperature sensor, and said switch, wherein said main body is potted to electrically insulate said electrical outlet to prevent at least one of entry and collection of water within said electrical outlet.

* * * * *